No. 736,671. Patented August 18, 1903.

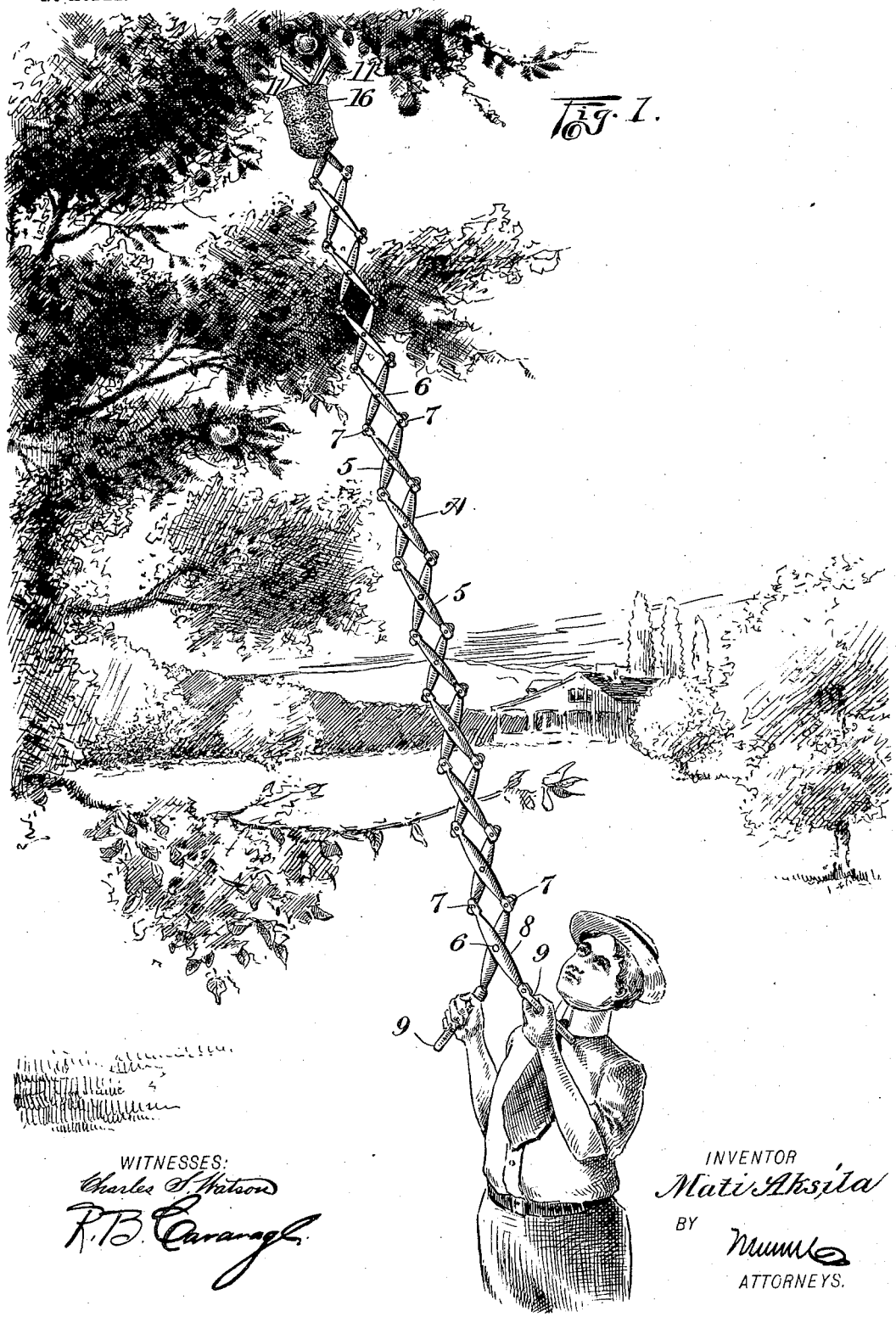

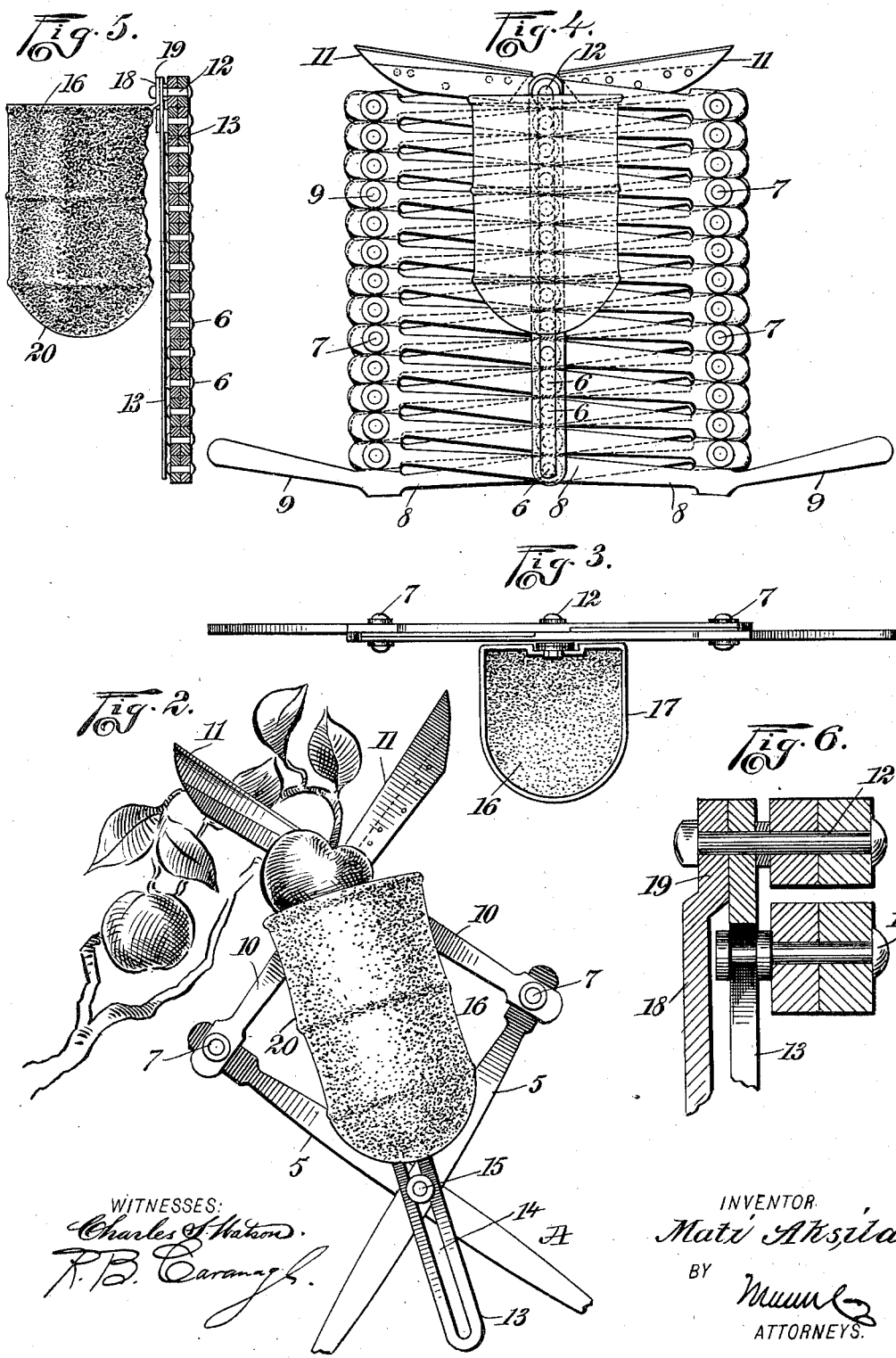

UNITED STATES PATENT OFFICE.

MATI AKSILA, OF WORCESTER, MASSACHUSETTS.

FRUIT-PICKER.

SPECIFICATION forming part of Letters Patent No. 736,671, dated August 18, 1903.

Application filed May 7, 1903. Serial No. 156,016. (No model.)

*To all whom it may concern:*

Be it known that I, MATI AKSILA, a citizen of Finland, and a resident of Worcester, in the county of Worcester and State of Massachusetts, have invented new and useful Improvements in Fruit-Pickers, of which the following is a full, clear, and exact description.

My invention relates to certain novel and useful improvements in devices for picking fruit.

In carrying out the present invention I have in contemplation an improved fruit-picker, which may be extended to a considerable height to enable the fruit to be removed from the highest branches of fruit-trees while the operator is standing on the ground, but when the device is out of use it may be collapsed or folded into compact form, whereby it may be stored in a very small space.

A further object of the invention is to provide the extensible frame or body portion of the device with a fruit-receiving bag or a receptacle into which the fruit will fall when removed from the limb, thus obviating the possibility of it dropping to the ground and being bruised or otherwise injured.

I have also in view as an object the provision of a fruit-picking device which will be simple in its construction, positive in its operation, and capable of being easily and quickly brought into use to perform its desired function.

With the above-recited objects and others of a similar nature in view my invention consists in the construction, combination, and arrangement of parts as is described in this specification, delineated in the accompanying drawings, and set forth in the annexed claims.

Reference is to be had to the accompanying drawings, forming a part of this specification, in which similar characters of reference indicate corresponding parts in all the figures.

Figure 1 is a perspective view of my improved fruit-picking device, such view also illustrating the manner of employing the same in removing fruit from trees. Fig. 2 is a view in side elevation of the upper knife-carrying portion of the extensible frame, said view showing the fruit-receptacle applied thereto. Fig. 3 is a top plan view of the parts shown in Fig. 2. Fig. 4 is a view in side elevation, showing the extensible frame or body portion of the device in its collapsed or folded position. Fig. 5 is a vertical sectional view taken through the device when in its folded position, as shown in Fig. 4; and Fig. 6 is an enlarged detail sectional view of the upper portion of the device to which is connected the receptacle.

Referring now to the accompanying drawings in detail, A designates the extensible staff or main member of the device, such member being formed of a series of bars 5, each pair of bars being pivoted centrally, as at 6, and at their end portions are connected by pivots 7 7 to the adjoining pairs of pivoted bars, such a construction forming what is commonly known as "lazy-tongs." The lower bars 8 of the lazy-tongs are longer than the other members 5, and are formed at their ends with handle portions 9 9, through the medium of which the tongs may be extended. The upper members or bars 10 10 of the tongs are provided with cutting blades or knives 11 11, arranged relative to each other to form clipping jaws or shears, such shears being pivoted at their intersection by a pin or bolt 12.

The bolt 12, which forms the pivot for the tongs, also passes through the upper end of a strip or bar 13, which bar is provided with a longitudinal slot 14, a bolt 15, similar to the bolts 6, which passes through the intersecting bars 5 5 immediately below the cutting-blades, also passing through the slot 14 in the bar 13, thus permitting the tongs to collapse easily and quickly, while at the same time the fruit-receptacle 16, which is supported immediately below and adjacent to the shears or cutting-jaws, is held rigidly and securely in position. This receptacle, as shown in the drawings, comprises an upper approximately U-shaped frame 17, formed of wood, metal, or other suitable material, said frame being connected or jointed to a vertical bar or rod 12, the upper portion of said rod being formed with a lip 19, having an aperture therein to permit said bar to be secured to the tongs or the extensible member through the medium of the bolt 12 of the cutting-jaws. Secured to this bar 12 at suitable intervals are a number of hoops or rings, said rings or hoops being adapted to form a frame for the covering 20 of the receptacle, which covering is formed of cloth, rubber, or other suitable flexible material, which will not cause the fruit to be damaged when dropped thereinto.

From the above description, taken in connection with the accompanying drawings, the construction and operation of my improved device will be readily apparent. When it is desired to remove the fruit from the tree, the operator grasps the lower or handle portions 9 9 at the lower end of the lazy-tongs and moving them toward each other extends the tongs upward to the desired height. The jaws or shears at the end of the tongs are brought together by the inward movement of the handles toward each other and the stem of the fruit will be severed, causing such fruit to drop into the receptacle immediately adjacent to the shears. The handles may then be moved outward away from each other, such movement contracting or collapsing the lazy-tongs frame until the device assumes a position such as shown in Fig. 4, when the fruit may be readily removed from the sack or receptacle.

It will be observed that I have provided an exceedingly simple fruit-picking device and which may be extended to any desired height to pluck fruit from the limbs of trees, and it will be further evident that the device may be formed of any light material, which will enable it to be easily and quickly manipulated.

Having thus described my invention, I claim as new and desire to secure by Letters Patent—

1. A fruit-picking device, comprising an extensible frame of lazy-tongs construction, cutting-jaws at the upper end of said frame, and a fruit-receptacle mounted adjacent to said jaws, substantially as set forth.

2. A fruit-picking device, comprising an extensible frame of the lazy-tongs construction, having handle portions formed at the lower end thereof, pivoted cutting-jaws mounted at the upper end of the lazy-tongs and a fruit-receptacle mounted on the lazy-tongs adjacent to said jaws, substantially as set forth.

3. A fruit-picking device, comprising an extensible frame of the lazy-tongs construction, the upper end of said lazy-tongs having pivoted knife-blades forming cutting-jaws, a slotted bar secured by the pivot passing through the intersecting knife-blades, and a receptacle secured below the cutting-jaws through the medium of the pivot passing through said jaws.

4. A fruit-picking device, comprising an extensible frame of the lazy-tongs construction, having handles formed at the lower end thereof, knife-blades forming cutting-jaws at the upper end of said lazy-tongs frame, a pivot passing through said knife-blades and connecting the same to form a cutting-shear, and a fruit-receptacle comprising a vertical bar secured to said pivot, hoops secured to said vertical bar and a flexible covering for said hoops, substantially as set forth.

In testimony whereof I have signed my name to this specification in the presence of two subscribing witnesses.

MATI AKSILA.

Witnesses:
  BEN. J. BERNSTROM,
  PETTER HEIKKILA.